United States Patent
Gaches et al.

(10) Patent No.: US 11,773,806 B2
(45) Date of Patent: Oct. 3, 2023

(54) ASSEMBLY FOR AN AIRCRAFT PROPULSION SYSTEM COMPRISING A HINGED STRUCTURE SUPPORTING THE FAN COWL AND THE THRUST REVERSER

(71) Applicant: Airbus Operations (S.A.S.), Toulouse (FR)

(72) Inventors: Thierry Gaches, Toulouse (FR); Laurent Cazeaux, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 17/870,255

(22) Filed: Jul. 21, 2022

(65) Prior Publication Data

US 2023/0184194 A1 Jun. 15, 2023

(30) Foreign Application Priority Data

Aug. 3, 2021 (FR) ...................................... 2108417

(51) Int. Cl.
*F02K 1/62* (2006.01)
*F02K 1/72* (2006.01)

(52) U.S. Cl.
CPC ................ *F02K 1/625* (2013.01); *F02K 1/72* (2013.01)

(58) Field of Classification Search
CPC ... F02K 1/763; F02K 1/72; F02K 1/64; F02K 1/80; F05D 2260/50; F05D 2240/129; F05D 2220/323
See application file for complete search history.

(56) References Cited

U.S. PATENT DOCUMENTS

| | | | |
|---|---|---|---|
| 8,316,632 B2* | 11/2012 | West | F02K 1/766 60/226.2 |
| 10,690,088 B2* | 6/2020 | Ridray | F02K 1/72 |
| 11,268,406 B2* | 3/2022 | Stanescu | F01D 25/243 |
| 11,428,190 B2* | 8/2022 | Grall | B64D 29/08 |
| 2009/0199536 A1* | 8/2009 | Bulin | F02K 1/72 60/226.2 |
| 2018/0362173 A1* | 12/2018 | Delaney | B64D 29/06 |
| 2019/0113002 A1* | 4/2019 | Sanz Martinez | F02K 1/64 |
| 2021/0079871 A1* | 3/2021 | Grall | F02K 1/80 |
| 2023/0119477 A1* | 4/2023 | Miller | F02C 7/32 60/802 |

FOREIGN PATENT DOCUMENTS

| | | |
|---|---|---|
| FR | 3 074 853 A1 | 6/2019 |
| FR | 3 101 674 A1 | 4/2021 |

OTHER PUBLICATIONS

French Search Report for Application No. 2108417 dated Mar. 24, 2022.

* cited by examiner

*Primary Examiner* — Anthony Ayala Delgado
(74) *Attorney, Agent, or Firm* — KDW Firm PLLC

(57) ABSTRACT

An assembly includes a structure with 6 o'clock and 12 o'clock beams and front and rear curved beams, in which the 12 o'clock beam is mounted to be able to rotate on a pylon of an aircraft between a closed position and a raised position, a fan cowl fixed to the structure, a thrust reverser with a rear cowl and that is able to move in translation along the 6 o'clock and 12 o'clock beams between a forward position and a backward position, cascades fixed to the thrust reverser, and a mover for moving the thrust reverser. With such an arrangement, the fan cowl and the thrust reverser are fixed to the same structure, and it is this structure that is hinged to the pylon.

9 Claims, 2 Drawing Sheets

ASSEMBLY FOR AN AIRCRAFT PROPULSION SYSTEM COMPRISING A HINGED STRUCTURE SUPPORTING THE FAN COWL AND THE THRUST REVERSER

CROSS-REFERENCE TO RELATED APPLICATION

This application claims priority to French patent application number 2108417 filed on Aug. 3, 2021, the entire disclosure of which is incorporated by reference herein.

TECHNICAL FIELD

The disclosure herein relates to an assembly for an aircraft propulsion system, the assembly comprising a structure hinged to a pylon of the propulsion system and supporting the fan cowl and the thrust reverser. The disclosure herein also relates to a propulsion system comprising a pylon and at least one such assembly hinged to the pylon, and to an aircraft comprising at least one such propulsion system.

BACKGROUND

An aircraft comprises a fuselage, to each side of which a wing is attached. At least one turbofan engine is suspended under each wing. Each turbofan engine is fixed under the wing by a pylon which is fixed between the wing structure and the turbofan engine structure.

The turbofan engine comprises an engine and a nacelle which is fixed around the engine.

The nacelle comprises, inter alia, two fan cowls and two thrust reversers arranged to either side of a vertical median plane. The top part of each fan cowl is fixed to the pylon by hinges with gooseneck fittings which allow the fan cowl to be raised in order to maintain the components housed under the fan cowl.

Each thrust reverser comprises a 12 o'clock beam, a 6 o'clock beam and a rear cowl fixed to the beams, and the thrust reverser is also fixed to the pylon by hinges that allow the thrust reverser to be opened for maintenance purposes and that are mounted between the 12 o'clock beam and the pylon. The 6 o'clock beam carries locks that lock the reverser by cooperating, for example, with the structure of the turbofan engine. Moreover, each thrust reverser comprises cascades secured to the rear cowl which is mounted so as to be able to move in translation over the 6 o'clock and 12 o'clock beams in order to allow the rear cowl and the cascades to be moved backwards during a thrust reverse phase.

Although such an architecture is satisfactory, in the operating position, part of the thrust reverser is located under the fan cowl, and the presence of the gooseneck fittings limits the possibility of integrating the various components under the fan cowl due to the size of these fittings.

It is therefore necessary to find an arrangement that eliminates the need for gooseneck fittings.

SUMMARY

One aim of the disclosure herein is an assembly for an aircraft propulsion system, the assembly comprising a structure hinged to a pylon of the aircraft and supporting the fan cowl and the thrust reverser, in which the structure comprises 6 o'clock and 12 o'clock beams to which the fan cowl and the thrust reverser are fixed and in which the 12 o'clock beam is hinged to the pylon.

To this end, an assembly for an aircraft propulsion system comprising a pylon is proposed, the assembly comprising:

a structure comprising a 12 o'clock beam, a 6 o'clock beam, a front curved beam and a rear curved beam, in which the front curved beam is fixed between the 12 o'clock beam and the 6 o'clock beam, in which the rear curved beam is fixed between the 12 o'clock beam and the 6 o'clock beam, towards the rear from the front curved beam, in which the 12 o'clock beam is intended to be mounted so as to be able to rotate on the pylon about an axis of rotation making the assembly rotatable between a closed position and a raised position, and in which the 6 o'clock beam carries locks intended to perform a locking function in the closed position, a fan cowl fixed to the structure, a thrust reverser comprising a rear cowl extending at the rear of the fan cowl, in which the thrust reverser is mounted so as to be able to move in translation along the 12 o'clock beam and the 6 o'clock beam between a forward position and a backward position, cascades fixed to the thrust reverser, and a mover designed to move the thrust reverser from the forward position to the backward position and vice versa.

With such an arrangement, the fan cowl and the thrust reverser are fixed to the same structure, and it is this structure that is hinged to the pylon.

Advantageously, the mover includes two actuators, in which each actuator has a cylindrical body fixed to the front curved beam and a rod that slides in the cylindrical body and that is fixed to the thrust reverser, one of the actuators is installed along the 12 o'clock beam and the other actuator is installed along the 6 o'clock beam.

Advantageously, the fan cowl is fixed simultaneously to the 12 o'clock beam, to the 6 o'clock beam, to the front curved beam and to the rear curved beam.

Advantageously, the fan cowl has at least one window in it and, for each window, the assembly comprises an access door hinged to the fan cowl.

The disclosure herein also proposes a propulsion system for an aircraft, the propulsion system comprising a pylon and an assembly according to one of the preceding variants, in which the 12 o'clock beam is mounted so as to be able to rotate on the pylon about an axis of rotation.

The disclosure herein also proposes an aircraft comprising at least one propulsion system according to the preceding variant.

BRIEF DESCRIPTION OF THE DRAWINGS

The abovementioned features of the disclosure herein, and others, will become clearer on reading the description that follows of one embodiment, the description being provided in reference to the appended drawings, in which.

DETAILED DESCRIPTION

Figure 1:
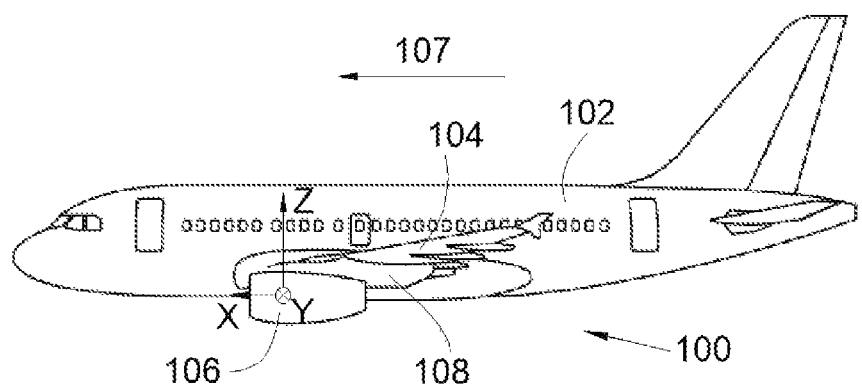
FIG. 1 is a side view of an aircraft according to the disclosure herein.

In the description that follows, the terms that relate to a position are taken to refer to an aircraft in a forward position as shown in FIG. 1.

FIG. 1 shows an aircraft 100 that comprises a fuselage 102, to each side of which a wing 104 is attached that carries at least one propulsion system according to the disclosure herein, which comprises a turbofan engine 106 and a pylon 108 that fastens the turbofan engine 106 under the wing 104.

Figure 2:
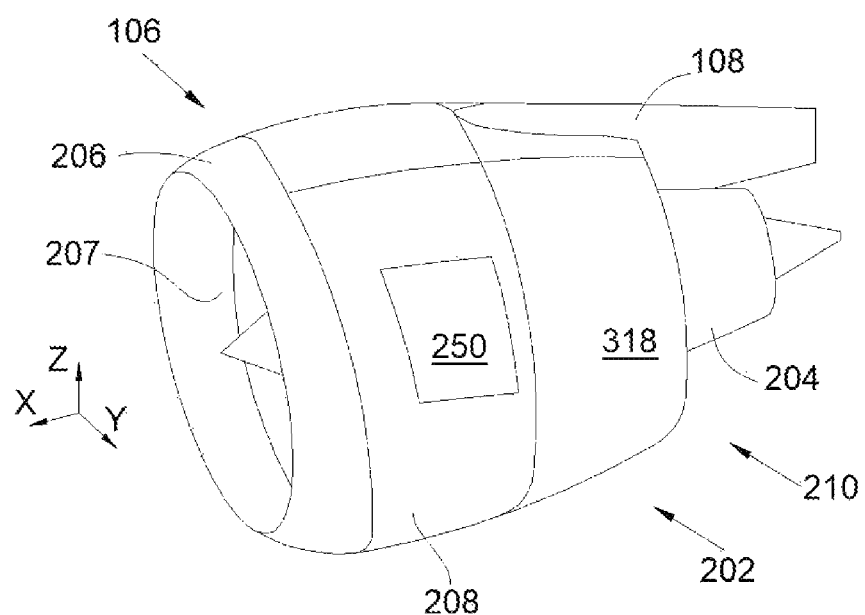
FIG. 2 is a perspective view of a propulsion system comprising assemblies according to the disclosure herein.

FIG. 2 shows the turbofan engine 106 that has a nacelle 202 and an engine 204 that is housed inside the nacelle 202.

In the description that follows and, as is conventional, X denotes the longitudinal axis of the turbofan engine 106, which is parallel to the longitudinal axis of the aircraft 100, in this instance oriented positively in the direction of travel of the aircraft 100, Y denotes the horizontal transverse axis when the aircraft 100 is on the ground, and Z denotes the vertical axis when the aircraft 100 is on the ground, these three directions X, Y and Z being orthogonal to each other.

The arrow 107 indicates the direction of forward travel of the aircraft 100 when the turbofan engines 106 are operating.

The nacelle 202 comprises, from the front towards the rear, a nose inlet cowl 206 that surrounds the air inlet 207, fan cowls 208 and thrust reversers 210. The nacelle 202 comprises a fan cowl 208 and a thrust reverser 210 to either side of a vertical median plane XZ. The thrust reverser 210 comprises, inter alia, a rear cowl 318 that extends to the rear of the fan cowl 208.

Figure 3:
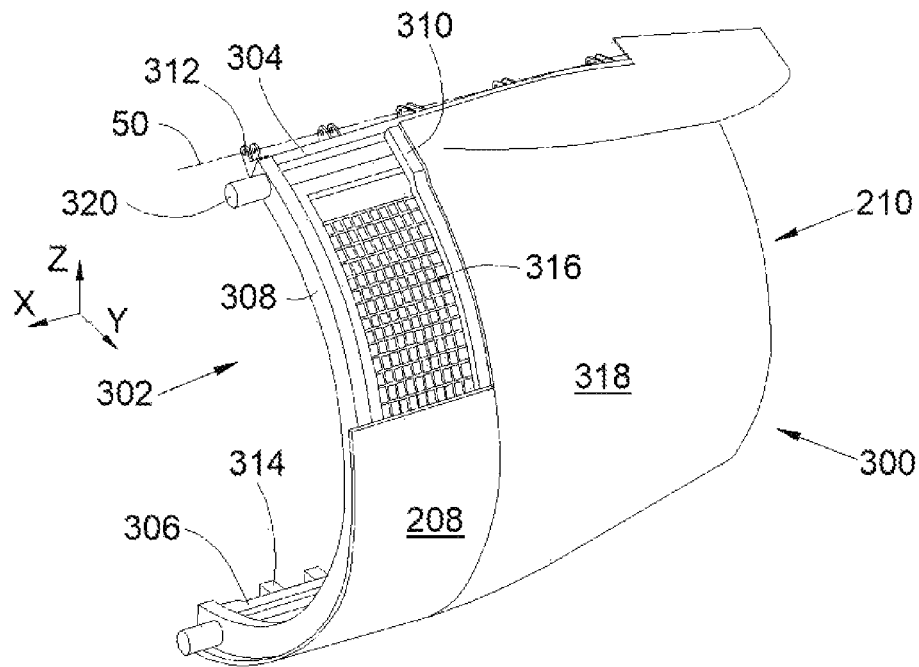
FIG. 3 is a perspective view of an assembly according to the disclosure herein seen from the outside.
Figure 4:
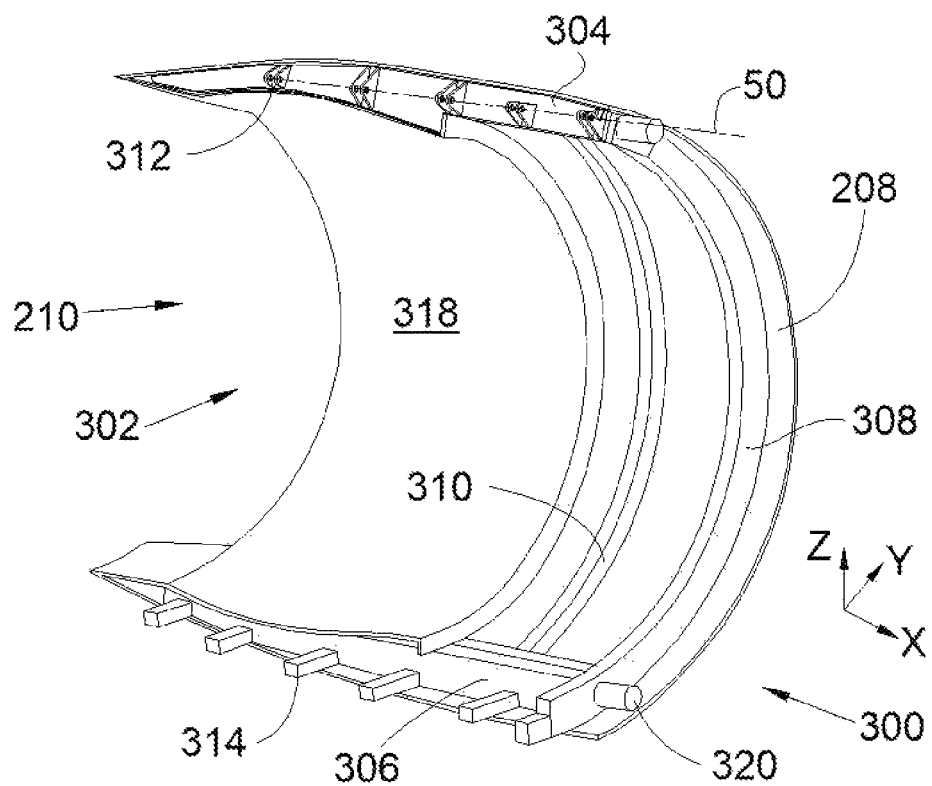
FIG. 4 is a perspective view of the assembly of FIG. 3 seen from the inside.

FIG. 3 and FIG. 4 show an assembly 300 according to the disclosure herein seen from the outside in FIG. 3 and from the inside in FIG. 4, with the fan cowl 208 partially cut away in FIG. 3 and without the cascades in FIG. 4. The propulsion system further comprises at least one assembly 300 according to the disclosure herein and, preferably, there is one assembly 300 to either side of the median plane XZ.

The assembly 300 comprises a structure 302 that comprises a 12 o'clock beam 304, a 6 o'clock beam 306, a front curved beam 308 and a rear curved beam 310.

The 12 o'clock beam 304 and the 6 o'clock beam 306 are generally parallel to the longitudinal axis X and the curved beams 308 and 310 extend in planes generally perpendicular to the longitudinal axis X.

The front curved beam 308 is fixed between the 12 o'clock beam 304 and the 6 o'clock beam 306 at a front end of the 12 o'clock beam 304 and a front end of the 6 o'clock beam 306. The rear curved beam 310 is fixed between the 12 o'clock beam 304 and the 6 o'clock beam 306 towards the rear, relative to the front curved beam 308, in this instance at an intermediate region of the 12 o'clock beam 304 and an intermediate region of the 6 o'clock beam 306 between their front and rear ends.

The structure 302 thus forms a frame whose sides are constituted by the 12 o'clock beam 304, the 6 o'clock beam 306, the front curved beam 308 and the rear curved beam 310.

The 12 o'clock beam is mounted so as to be able to rotate on the pylon 108 about an axis of rotation 50 generally parallel to the longitudinal axis X by several hinges, the fixed parts of which are fixed to the pylon 108 and the moving parts 312 of which are fixed to the 12 o'clock beam. Owing to the presence of these hinges, the assembly 300 is able to rotate on the pylon 108 between a closed position that corresponds to the operating position of the turbofan engine 106 and a raised position that corresponds to a maintenance position in which the assembly 300 is raised in order to allow a technician to access the inside of the turbofan engine 106. In this arrangement, there is therefore a single axis of rotation for the fan cowl 208 and the thrust reverser 210.

The 6 o'clock beam 306 carries a plurality of locks 314 that are designed to lock the assembly 300 in the closed position, in particular by cooperating with the structure of the turbofan engine 106.

The thrust reverser 210 is mounted so as to be able to move in translation on the structure 302, in particular along the 12 o'clock beam 304 and the 6 o'clock beam 306, for example by slides. The movement of the thrust reverser 210 is a translational movement in a direction of translation generally parallel to the longitudinal axis X.

The thrust reverser 210 is able to move between a forward position and a backward position, and vice versa. In the forward position, the thrust reverser 210 is positioned as far forward as possible such that the rear cowl 318 is close to the fan casing 208. In the backward position, the thrust reverser 210 is positioned as far back as possible such that the rear cowl 318 is at a distance from the fan casing 208.

In the forward position, the rear cowl 318 and the fan casing 208 extend each other.

In the backward position, the rear cowl 318 and the fan casing 208 are spaced apart from each other and together define an open window between a secondary air stream of the turbofan engine 106 and the outside of the nacelle 202. In other words, the air from the secondary air stream passes through the window to the outside of the turbofan engine 106.

The assembly 300 also comprises a mover designed to move the thrust reverser 210 from the forward position to the backward position and vice versa.

The assembly 300 also comprises cascades 316 (not shown in FIG. 4) that are fixed to the thrust reverser 210, at the front of same, and that therefore move in translation at the same time. In the backward position, the cascades are positioned next to the window in order to redirect, towards the front, the flow passing from the inside to the outside of turbofan engine 106. In the forward position, the cascades 316 are situated between the front curved beam 308 and the rear curved beam 310, under the fan cowl 208. On each side of the assembly 300, there is a plurality of cascades 316 between the 12 o'clock beam and the 6 o'clock beam, and these cascades are arranged successively along the circumference of the assembly 300.

According to the disclosure herein, the assembly 300 also comprises the fan cowl 208 which is also fixed to the structure 302 by any suitable fixing device(s), for example rivets, bolts, etc.

Because the fan cowl 208 is fixed to the structure 302, it is no longer necessary to install gooseneck fittings, since the fan cowl 208 is allowed to open by virtue of the hinges between the pylon 108 and the 12 o'clock beam 304, helping save space and weight. Moreover, during maintenance, it is no longer necessary to open two separate panels, namely the fan cowl and the rear cowl, but only one single panel constituted by the fan cowl 208 and the rear cowl 318. Moreover, the fact that the fan cowl 208 is fixed to the structure 302 itself carrying the rear cowl 318 makes it possible to reduce the ribbing and improve the abutment between the fan cowl 208 and the rear cowl 318.

In the embodiment of the disclosure herein shown in FIGS. 3 and 4, the mover includes two actuators 320, in particular double-acting actuators, and each actuator 320 has, inter alia, a cylindrical body fixed to the front curved beam 308 and a rod that slides in the cylindrical body and that is fixed to the thrust reverser 210 and that is parallel to the direction of movement of the thrust reverser 210.

In order to limit deformations of the structure 302 during the activation of the actuators 320, one of the actuators 320 is installed along the 12 o'clock beam 304 and parallel thereto and the other actuator 320 is installed along the 6 o'clock beam 306 and parallel thereto. Each actuator 320 therefore passes through the frame as close as possible to the 12 o'clock beam 304 or the 6 o'clock beam 306.

In order to further reinforce the frame, when the actuators 320 are activated, the fan cowl 208 is fixed simultaneously to the 12 o'clock beam 304, to the 6 o'clock beam 306, to the front curved beam 308 and to the rear curved beam 310, thus increasing the stiffness of the frame.

In order to allow access to the interior the fan cowl 208 without needing to raise the assembly 300, the fan cowl 208 has at least one window in it and, for each window, the assembly 300 comprises an access door 250 hinged to the fan cowl 208. Such an access door 250 can be used for recurring maintenance tasks that do not require the assembly 300 to be fully opened. The access door 250 is, for example, fixed to the fan cowl 208 by hinges and is able to rotate alternately between a closed position, in which it blocks the window, and an open position, in which it does not block the window. A locking is provided in order to lock the access door in the closed position.

In order to further increase the stiffness of the fan cowl 208, it may comprise, on its inner face, reinforcing ribs running along the inner face.

In another embodiment, the fan cowl 208 may be made from a multilayer material.

In another embodiment of the disclosure herein, not shown in the figures, one of the actuators is installed in the vicinity of the 12 o'clock beam 304, with an extension axis parallel thereto, and the other actuator is installed in the vicinity of the 6 o'clock beam 306, with an extension axis parallel thereto. More specifically, when there are several successive cascades, one actuator is installed between the two first cascades from the 12 o'clock beam 304 and the other actuator is installed between the first cascades from the 6 o'clock beam 306.

This configuration makes it possible to reduce the size of the lever arms and the forces in the mechanisms used to move the thrust reverser in translation.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft propulsion system comprising a pylon, the assembly comprising:
   a structure comprising:
      a 12 o'clock upper beam;
      a 6 o'clock lower beam;
      a front curved beam fixed between the 12 o'clock upper beam and the 6 o'clock lower beam; and
      a rear curved beam fixed between the 12 o'clock upper beam and the 6 o'clock lower beam towards a rear of the assembly from the front curved beam;
      wherein the 12 o'clock upper beam is mounted on the pylon such that the 12 o'clock upper beam is rotatable about an axis of rotation, such that the assembly is rotatable between a closed position and a raised position; and
      wherein the 6 o'clock lower beam carries locks to perform a locking function when the assembly is in the closed position;
   a fan cowl fixed to the structure;
   a thrust reverser comprising a rear cowl extending at a rear of the fan cowl, wherein the thrust reverser is mounted movable in translation along the 12 o'clock upper beam and the 6 o'clock lower beam, between a forward position and a backward position;
   cascades fixed to the thrust reverser; and
   a mover configured to move the thrust reverser from the forward position to the backward position and from the backward position to the forward position.

2. The assembly of claim 1, wherein the mover comprises two actuators, in which each actuator has a cylindrical body fixed to the front curved beam and a rod that slides in the cylindrical body and that is fixed to the thrust reverser, wherein one of the actuators is installed along the 12 o'clock upper beam and wherein another actuator is installed along the 6 o'clock lower beam.

3. The assembly of claim 2, wherein the fan cowl is fixed simultaneously to the 12 o'clock upper beam, to the 6 o'clock lower beam, to the front curved beam and to the rear curved beam.

4. The assembly of claim 1, wherein the fan cowl has at least one window in it and wherein, for each window, the assembly comprises an access door hinged to the fan cowl.

5. A propulsion system for an aircraft, the propulsion system comprising an assembly of claim 1 and the pylon, the 12 o'clock upper beam being rotatably mounted on the pylon about the axis of rotation.

6. An aircraft comprising at least one propulsion system of claim 5.

7. The assembly of claim 1, wherein the 12 o'clock upper beam and the 6 o'clock lower beam are generally parallel to a longitudinal axis of a turbofan engine of the aircraft propulsion system.

8. The assembly of claim 7, wherein:
   the front curved beam extends in a plane that is generally perpendicular to the longitudinal axis; and
   the rear curved beam extends in a plane that is generally perpendicular to the longitudinal axis.

9. The assembly of claim 7, wherein the axis of rotation is generally parallel to the longitudinal axis.

* * * * *